(12) United States Patent
Zhou et al.

(10) Patent No.: US 12,268,139 B2
(45) Date of Patent: Apr. 8, 2025

(54) WATER RECYCLING TYPE GREENHOUSE

(71) Applicant: Institute of Urban Agriculture, Chinese Academy of Agricultural Sciences, Chengdu (CN)

(72) Inventors: Wanlai Zhou, Chengdu (CN); Qichang Yang, Chengdu (CN); Zhiyong Qi, Chengdu (CN); Wei Lu, Chengdu (CN); Bo Zhou, Chengdu (CN); Nan Wang, Chengdu (CN)

(73) Assignee: Institute of Urban Agriculture, Chinese Academy of Agricultural Sciences, Chengdu (CN)

( * ) Notice: Subject to any disclaimer, the term of this patent is extended or adjusted under 35 U.S.C. 154(b) by 275 days.

(21) Appl. No.: 18/124,001

(22) Filed: Mar. 21, 2023

(65) Prior Publication Data
US 2023/0217866 A1    Jul. 13, 2023

(30) Foreign Application Priority Data

Apr. 14, 2022    (CN) .......................... 202210390954.2

(51) Int. Cl.
*A01G 9/24*    (2006.01)
*F24F 3/14*    (2006.01)

(52) U.S. Cl.
CPC ............. *A01G 9/247* (2013.01); *A01G 9/246* (2013.01); *F24F 3/1405* (2013.01)

(58) Field of Classification Search
CPC ............... F24F 3/1405; F24F 2003/144; F24F 2003/1446; A01G 9/246; A01G 9/247; A01G 9/24; A01G 9/14; F25B 25/005; F25B 13/00; F25B 30/02
See application file for complete search history.

(56) References Cited

U.S. PATENT DOCUMENTS

| | | | |
|---|---|---|---|
| 2015/0150202 A1 | 6/2015 | Hessel et al. | |
| 2018/0192596 A1 | 7/2018 | Howis | |
| 2021/0352853 A1* | 11/2021 | Day | F24F 11/65 |
| 2022/0167566 A1 | 6/2022 | Steentjes et al. | |

FOREIGN PATENT DOCUMENTS

| | | | | | |
|---|---|---|---|---|---|
| CN | 103477916 A | * | 1/2014 | ............. | A01G 9/246 |
| CN | 109804827 A | * | 5/2019 | | |
| CN | 109997575 B | * | 2/2022 | ............... | A01G 9/24 |

* cited by examiner

*Primary Examiner* — Joseph F Trpisovsky
(74) *Attorney, Agent, or Firm* — Jose Cherson Weissbrot

(57) ABSTRACT

The present disclosure discloses a water recycling type greenhouse, including a greenhouse body; a water collection device is arranged in the greenhouse body; the water collection device is provided with an air inlet and an air outlet; a condensation portion and a reheating portion are arranged in the water collection device; and the water recycling type greenhouse further includes an energy supply system. Air in the greenhouse body can be poured into the water collection device from the air inlet, flow through the condensation portion and the reheating portion in sequence, and finally be discharged into the greenhouse body again from the air outlet. When the heated air is discharged into the greenhouse body again, a decrease of the temperature of the greenhouse is not likely to occur, and normal growth of plants is not easily affected.

10 Claims, 8 Drawing Sheets

WATER RECYCLING TYPE GREENHOUSE

TECHNICAL FIELD

The present disclosure relates to the technical field of greenhouses, in particular to a water recycling type greenhouse.

BACKGROUND

Greenhouse is a key component of facility agriculture in China. A greenhouse can provide growth periods and increase yields in seasons that are not suitable for growth of plants. Greenhouses are mostly used for cultivation or seedling raising of plants such as warm-season vegetables, flowers and trees in low-temperature seasons. The greenhouses have played a huge role in ensuring a balanced annual supply of vegetables, increasing employment and promoting income.

In some districts of China, such as Xinjiang, there is sufficient light, which is very suitable for the growth of melon and fruit vegetables. However, these districts are often arid and lack of rain. The lack of water has become a key factor that restricts agricultural development in these districts. However, crops in a greenhouse demand for a large amount of water. For example, a daily water consumption of a single tomato plant in a picking period reaches about 1.5 L, and a daily water consumption per square meter of a greenhouse space exceeds 5 L. Most water enters air through transpiration and bottom evaporation of plants, resulting in a sharp increase in humidity in the greenhouse.

At present, there are some technical means to obtain water from air in the existing technology. Technically, there may be three kinds of technologies: an adsorption method, a fogging water extraction method and a condensation and dew formation method. The condensation and dew formation method is used most. The condensation and dew formation method is to cool a cooling plate through compression refrigeration or semiconductor refrigeration. Air with moisture flows through the cooling plate with a relatively low temperature. After the temperature drops, water drops will be formed on a surface of the cooling plate by means of dew formation. Although the technical principle is simple, this method has the problems of high energy consumption and low water recycling efficiency. Therefore, it is rare to use the condensation and dew formation method to obtain water from air in a greenhouse. Furthermore, the simple application of the condensation and dew formation method will lead to a decrease in an air temperature in the greenhouse, which is not conducive to the growth of plants. Obviously, how to efficiently use the condensation and dew formation method to obtain water from the air in the greenhouse and balance the temperature in the greenhouse has become an urgent problem to be solved.

SUMMARY

The present disclosure aims to overcome the shortcomings in the existing technology, and provides a water recycling type greenhouse.

The objective of the present disclosure is achieved through the following technical solutions:

A water recycling type greenhouse includes a greenhouse body; a water collection device is arranged in the greenhouse body; the water collection device is provided with an air inlet and an air outlet; a condensation portion and a reheating portion are arranged in the water collection device; air in the greenhouse body is poured from the air inlet and flows through the condensation portion, the reheating portion and the air outlet in sequence; the water recycling type greenhouse further includes an energy supply system; the energy supply system can supply a cold source to the condensation portion, so that the air flows through the condensation portion to coagulate water; the energy supply system can further supply a heat source to the reheating portion, so that the reheating portion heats the air flowing by; the water recycling type greenhouse further includes an air pumping device; the air pumping device and the water collection device are respectively located on two opposite sides of the greenhouse body; the air drafting device can pump the air in the greenhouse body to the air inlet, so that the air in the greenhouse body is circulated between the water collection device and the air pumping device.

By means of the above technical solution, the water collection device and the air pumping device are arranged in the greenhouse body. The air pumping device pumps the air in the greenhouse body to the air inlet of the water collection device, and the air will then flow through the condensation portion and the reheating portion in sequence and finally be discharged into the greenhouse body from the air outlet. During the period, the condensation portion has a low temperature under cold supplied by the energy supply system, so that when the air with relatively high humidity flows through the condensation portion, water can be coagulated on a surface of the condensation portion, which realizes a function of the water collection device for obtaining water from the air in the greenhouse. When the moisture-removed air with a relatively low temperature flows through the reheating portion, since the reheating portion has a high temperature under heat supplied by the energy supply system, the reheating portion can heat the air flowing by. When the heated air is discharged into the greenhouse body again, a decrease of the temperature of the greenhouse is not likely to occur, and normal growth of plants is not easily affected.

In addition, the water collection device can also be used for regulating and controlling a temperature of the greenhouse. For example, when the temperature of the greenhouse needs to be reduced, the energy supply system can be controlled to not provide the heat source to the reheating portion. At this time, the moisture-removed air with a relatively low temperature flows into the greenhouse body again, and the temperature of the greenhouse can be reduced. When the temperature of the greenhouse needs to be increased, the energy supply system is controlled to provide an abundant heat source to the reheating portion. At this time, the air discharged to the greenhouse body can make the temperature of the greenhouse rise. It can be understood that the amount of the heat source supplied by the energy supply system to the reheating portion can control a specific temperature of the air discharged by the water collection device, so that the temperature in the greenhouse is accurately regulated to satisfy fast growth of plants.

Compared with the existing technology, the water recycling type greenhouse of the present disclosure can regulate the temperature of the greenhouse while obtaining water from the air in the greenhouse. The water recycling type greenhouse has relatively high applicability.

Preferably, the air pumping device includes an axial flow fan arranged on a side wall of the greenhouse body, and a return air duct communicated to the axial flow fan; an air supply outlet of the return air duct is communicated to the air inlet; and the axial flow fan is used for pumping the air in the greenhouse body to the return air duct.

By means of the above technical solution, the axial flow fan can efficiently pump the air in the greenhouse body to the return air duct, and the return air duct leads the air into the air inlet of the water collection device, so that the water obtaining efficiency of the water collection device is further improved.

Preferably, the return air duct is located outside the greenhouse body, and is buried in an underground soil layer.

By means of the above technical solution, low-temperature soil can be used to cool the air flowing through the return air duct, so that a cold source load of the condensation portion can be reduced, and energy consumption of the water collection device is reduced to a certain extent.

Preferably, the condensation portion includes several arrayed condensers; cooling cavities are arranged in the condensers; bottom ends of the condensers are provided with cold source inlets communicated to the cooling cavities; top ends of the condensers are provided with cold source outlets communicated to the cooling cavities; the energy supply system can inject a cold source to each cold source inlet; and the cold source returns to the energy supply system from the cold source outlets.

By means of the above technical solution, the energy supply system can inject the cold source to each cold source inlet, and the cold source makes the condenser have a low temperature, and will return to the energy supply system from the cold source outlet. That is, a circulation flow path for the cold source is provided in the cooling cavities. That is, the condenser can be kept in a stable low-temperature state, so that water is efficiently coagulated on a surface of the condenser from the air flowing by, and the water obtaining efficiency of the water collection device on the air in the greenhouse is improved.

Preferably, the condensers are columnar condensers; the water collection device is provided with a water outlet located below the condensation portion; surfaces of the condensers are provided with several hydrophilic convex bars; the several hydrophilic convex bars have different sizes; and the sizes of the several hydrophilic convex bars gradually increase along axial directions of the condensers towards one side of the water outlet.

By means of the above technical solution, when the air flows through the condensation portion, the water is more easily coagulated on the hydrophilic convex bars from the air based on the hydrophilicity of the hydrophilic convex bars. The coagulated water can drop down along the columnar condensers and be discharged from the water outlet, thereby achieving quick collection of water. Furthermore, the sizes of the hydrophilic convex bars gradually increase along the axial directions of the condensers, so that the hydrophilic convex bars distributed in this way can achieve a balance between promoting water to be coagulated and gathering and transferring water drops, and the hydrophilic convex bars with larger bottoms can gather coagulated water drops with a larger diameter. This part of water drop is more easily gathered together and flows down into the water outlet for discharging. The fast discharging of water can restore the surfaces of the condensers to a use state for coagulating water, thereby further improving the water obtaining efficiency of the condensers on the air in the greenhouse, that is, the water collection device can efficiently obtain water from the air in the greenhouse.

Preferably, an aspect ratio of a longitudinal section of each hydrophilic convex bar is 3:1-4:1.

By means of the above technical solution, the hydrophilic convex bars have higher efficiency of coagulating water from the air in the greenhouse.

Preferably, a cross section of each condenser has a blunt end and a sharp end which are opposite; the blunt end and the sharp end are in arc transition; the blunt end faces one side of the air inlet; and axial lines of the blunt end and the sharp end are parallel to an air flow direction of the air inlet.

By means of the above technical solution, the air in the greenhouse enters the water collection device from the air inlet. The condensers have the axial lines parallel to the air flow direction of the air inlet, so that the air passes through the condensers more easily and adheres water. The condensers each have a unique cross section structure, so that the air will first contact the blunt ends of the condensers, and then slowly pass through the surfaces of the condensers. The condensers of this structure are conductive to coagulating the water in the air to the surfaces of the condensers more quickly and efficiently, thus improving the water obtaining efficiency of a water obtaining device.

Preferably, an aspect ratio of the cross section of each condenser is 4:1-2:1.

By means of the above technical solution, flowing of the air through the condensers becomes slow, so that the water in the air is more easily coagulated on the surfaces of the condensers, and the water obtaining efficiency of the water obtaining device is further improved.

Preferably, the reheating portion includes several heat dissipation fins arrayed along a vertical direction; heating cavities are arranged in the heat dissipation fins; one end of each heat dissipation fin is provided with a heat source inlet communicated to the heating cavity; the other end of each heat dissipation fin is provided with a heat source outlet communicated to the heating cavity; the energy supply system can inject a heat source to each heat source inlet; and the heat source returns to the energy supply system from the heat source outlet.

By means of the above technical solution, the energy supply system can inject the heat source to each heat source inlet. The heat source makes the condenser have a high temperature, and will return to the energy supply system from the heat source outlet. That is, a circulation flow path for the heat source is provided in the heating cavities. That is, the heat dissipation fins can be kept in a stable high-temperature state, so that the air flowing by can be stably heated, and the temperature in the greenhouse body is not easily reduced.

Preferably, an air guide portion and a fog collection net are further arranged in the water collection device; the air guide portion is located between the air inlet and the condensation portion; two ends of the air guide portion are respectively communicated to the air inlet and the condensation portion; the air guide portion is used for guiding the air entering the air inlet to the condensation portion; and the fog collection net is located between the condensation portion and the reheating portion.

By means of the above technical solution, the air guide portion can uniformly guide the air to one side of the condensation portion, so that the air can contact the condensation portion to a largest extent, and the water coagulating rate of the condensation portion is increased. Furthermore, when the air flows through the fog collection net, the water will also be coagulated on the fog collection net, and the water coagulating rate of the water obtaining device is further improved.

Figure 1:
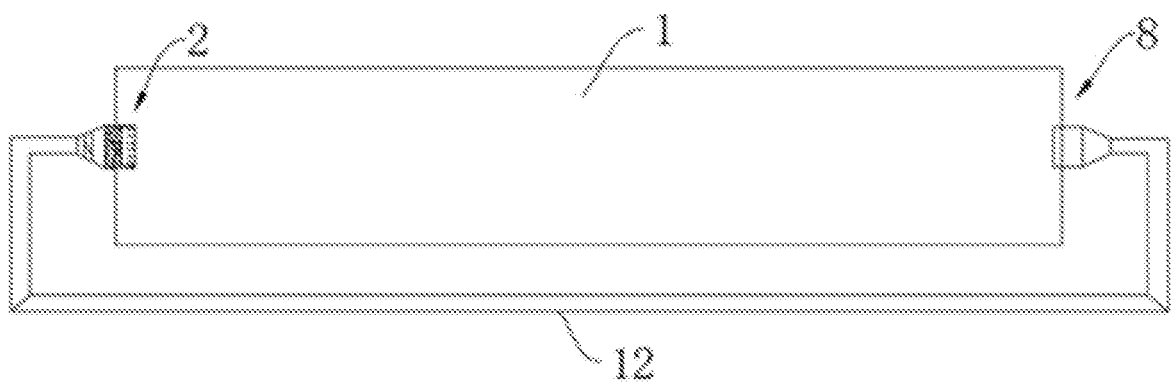
FIG. 1 is a schematic diagram of distribution of a water collection device and an air pumping device.
Figure 2:
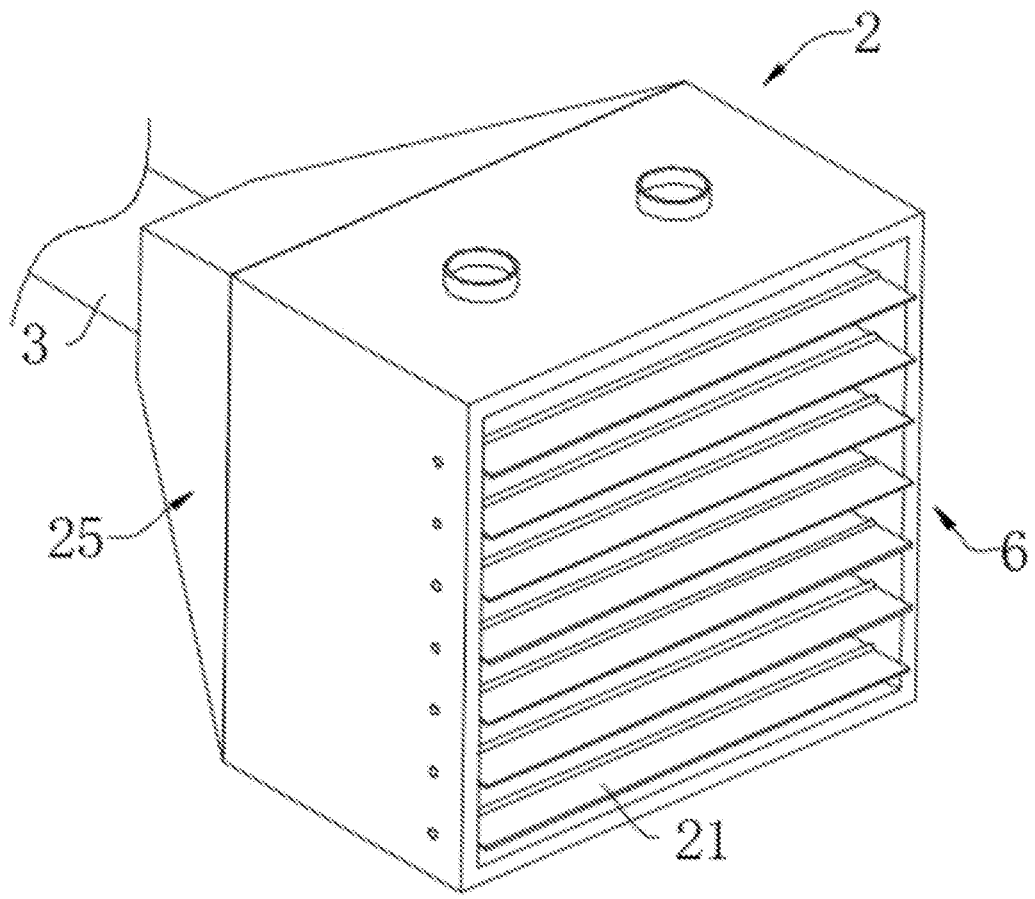
FIG. 2 is a schematic structural diagram of a water collection device.
Figure 3:
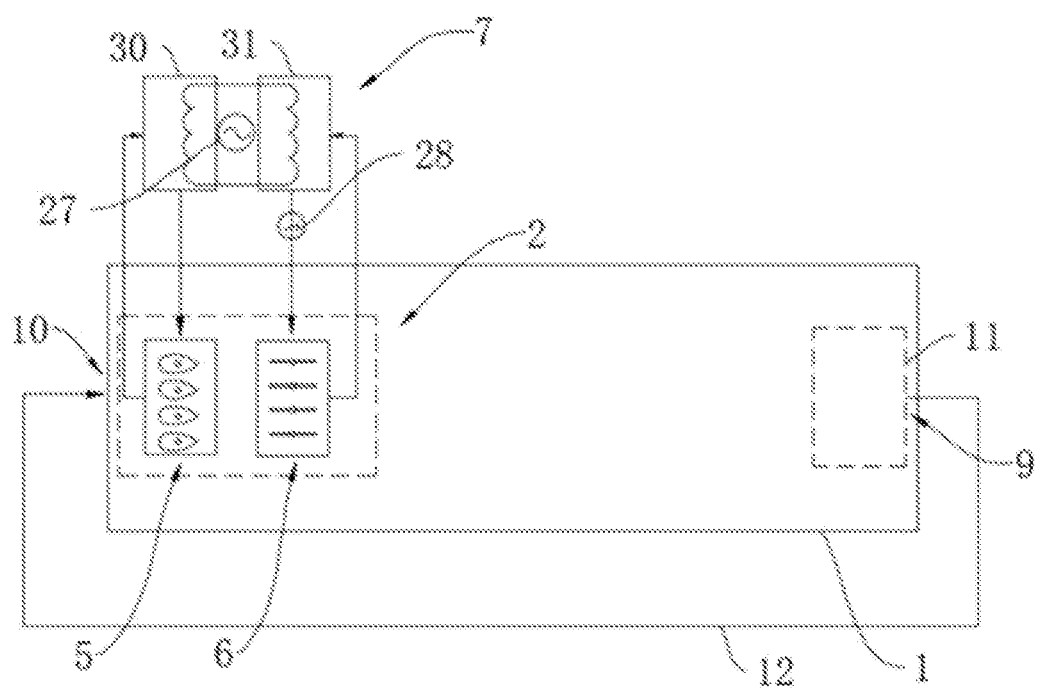
FIG. 3 is a schematic diagram of a flowing path of a cold source and a heat source between an energy supply system and a water collection device.
Figure 4:
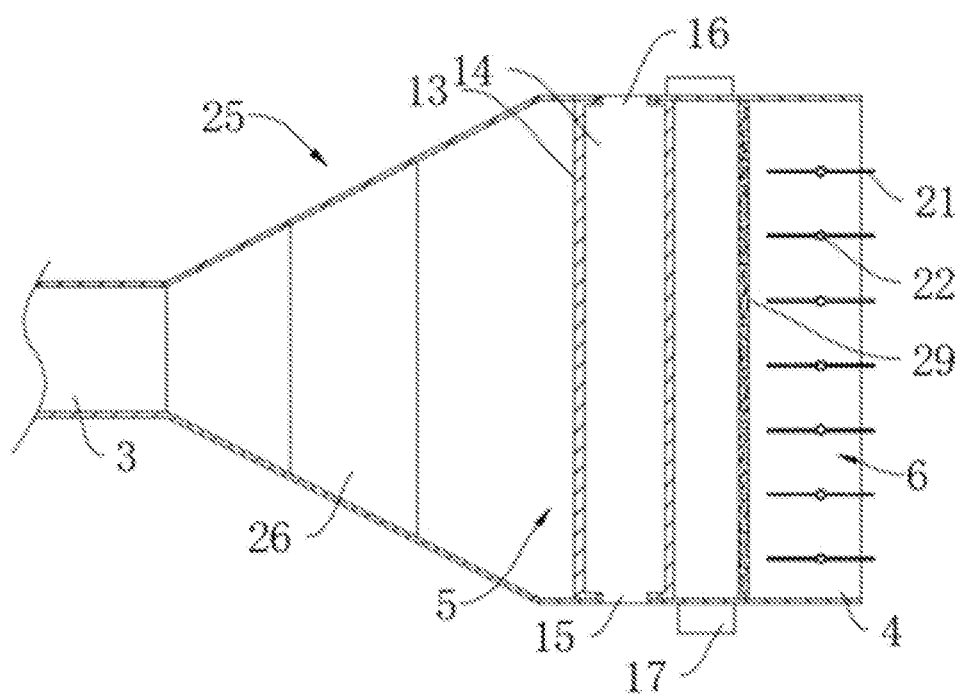
FIG. 4 is a schematic sectional diagram of a longitudinal section of a water collection device.
Figure 5:
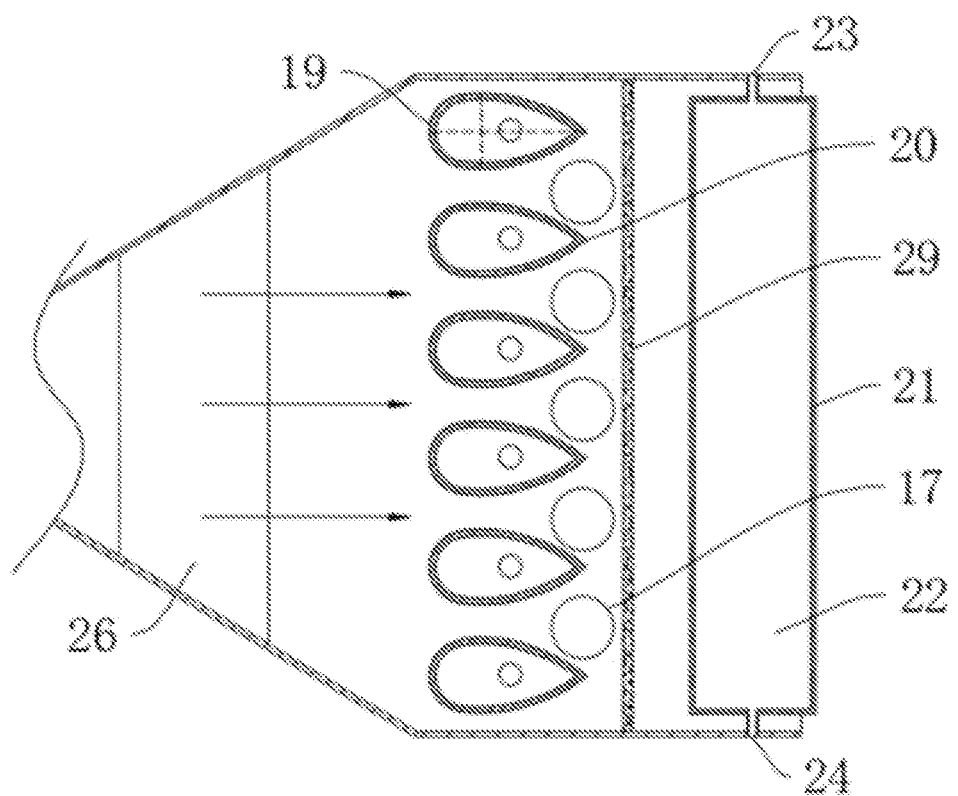
FIG. 5 is a schematic sectional diagram of a cross section of a water collection device.
Figure 6:
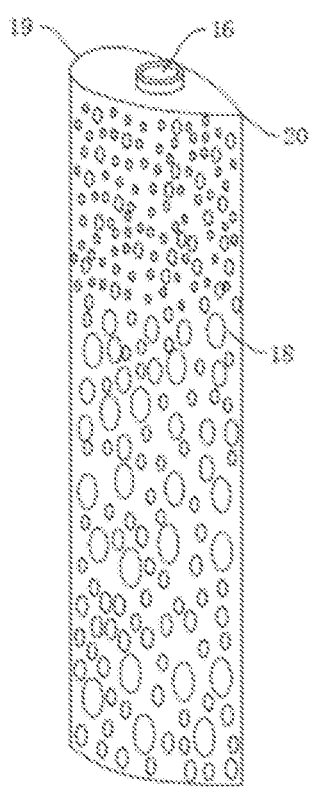
FIG. 6 is a schematic structural diagram of a condenser.
Figure 7:
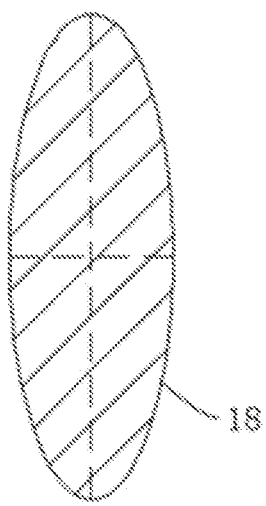
FIG. 7 is a schematic sectional diagram of a longitudinal section of a hydrophilic convex bar.
Figure 8:
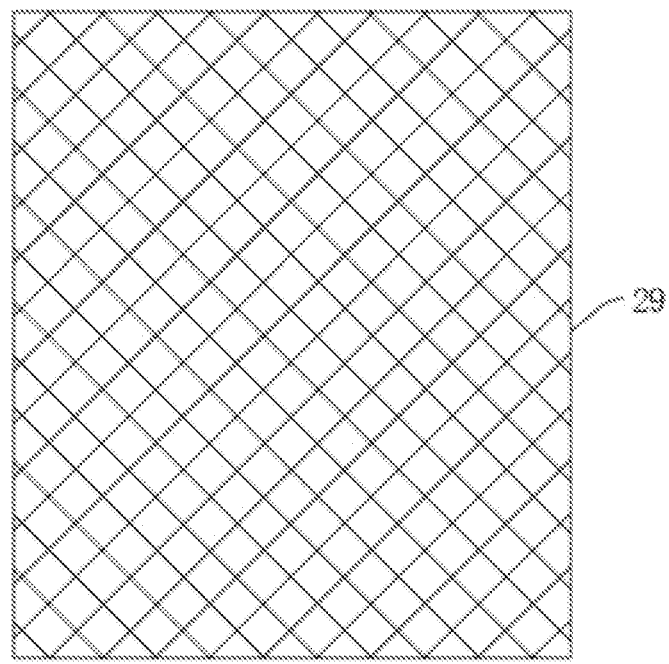
FIG. 8 is a schematic structural diagram of a fog collection net.

Numerals in the drawings: 1: greenhouse body; 2: water collection device; 3: air inlet; 4: air outlet; 5: condenser; 6: reheating portion; 7: energy supply system; 8: air pumping device; 9: pumping opening; 10: air supply outlet; 11: axial flow fan; 12: return air duct; 13: condenser; 14: cooling cavity; 15: cold source inlet; 16: cold source outlet; 17: water outlet; 18: hydrophilic convex bar; 19: blunt end; 20: sharp end; 21: heat dissipation fin; 22: heating cavity; 23: heat source inlet; 24: heat source outlet; 25: air guide portion; 26: air separator; 27: heat pump system; 28: flow valve; 29: fog collection net; 30: cold end; and 31: hot end.

DETAILED DESCRIPTION OF THE EMBODIMENTS

Technical solutions of the present disclosure will be described clearly and completely below in combination with the embodiments. Obviously, the embodiments described herein are only part of the embodiments of the present disclosure, not all the embodiments. Based on the embodiments in the present disclosure, all other embodiments obtained by those skilled in the art without creative work shall fall within the scope of protection of the present disclosure.

As shown in FIG. 1, a water recycling type greenhouse includes a greenhouse body 1.

As shown in FIG. 1 to FIG. 8, an air pumping device 8 and a water collection device 2 are arranged at two opposite sides of the greenhouse body 1. The water collection device 2 is provided with an air inlet 3 and an air outlet 4. The air pumping device 8 can pump air in the greenhouse body 1 to the air inlet 3 of the water collection device 2. The water collection device 2 can obtain water from the air, and discharge the dry air from the air outlet 4. Specifically, the water collection device 2 includes the air inlet 3, an air guide portion 25, a condensation portion 5, a reheating portion 6 and the air outlet 4 which are arranged in sequence. The air pumping device 8 pumps the air in the greenhouse body 1 to the air inlet 3. The air flows to the condensation portion 5 via the air guide portion 25 to coagulate water. The air that is dehumidified by the condensation portion 5 and has a relatively low temperature will then flow to the reheating portion 6. The reheating portion 6 can heat the air, and the heated air is discharged to the greenhouse body 1 again through the air outlet 4, thereby achieving a use effect of not causing a decrease in the temperature of the greenhouse while condensing water by the water collection device 2. Of course, the greenhouse further comprises an energy supply system 7. The energy supply system 7 can provide a cold source to the condensation portion 5 and also provide a heat source to the reheating portion 6, thereby satisfying use effects of the condensation portion 5 and the reheating portion 6.

More specifically, the air guide portion 25 includes several air separators 26 connected in sequence. Diameters of flowing ports of the air separators 26 gradually decrease towards one side of the air inlet 3 and gradually increase towards one side of the condensation portion 5. In this way, the air guide portion 25 can receive air from the air inlet 3 and uniformly guide the air to one side of the condensation portion 5. The condensation portion 5 is in full contact with the air, which improves the water obtaining efficiency.

The condensation portion 5 includes several arrayed condensers 13 perpendicular to an air guide flow direction of the air guide portion 25. The air is guided by the air guide portion 25 to be circulated between the several condensers 13, thus coagulating water to surfaces of the condensers 13. Cooling cavities 14 are arranged in the condensers 13. Bottom ends of the condensers 13 are provided with cold source inlets 15 communicated to the cooling cavities 14, and top ends of the condensers 13 are provided with cold source outlets 16 communicated to the cooling cavities 14. The above energy supply system 7 can inject the cold source to each cold source inlet 15, so that the surfaces of the condensers 13 have a low temperature to coagulate the water in the air. The cold source entering the cooling cavities 14 can return to the energy supply system 7 again through the cold source outlets 16. In other words, the cold source in the cooling cavities 14 cyclically flows under the actuation of the energy supply system 7. In this way, the condensers 13 can be kept in a stable low-temperature state, thus improving the water obtaining efficiency of the water collection device 2.

The reheating portion 6 includes several heat dissipation fins 21 arrayed along a vertical direction. Heating cavities 22 are arranged in the heat dissipation fins 21. One end of each heat dissipation fin 21 is provided with a heat source inlet 23 communicated to the heating cavity 22, and the other end of the heat dissipation fin 21 is provided with a heat source outlet 24 communicated to the heating cavity 22. The above energy supply system 7 can inject the heat source to each heat source inlet 23, so that the surfaces of the heat dissipation fins 21 have a high temperature to heat the air flowing by. The heat source entering the heating cavities 22 can return to the energy supply system 7 again through the heat source outlets 24. In other words, the heat source in the heating cavities 22 cyclically flows under the actuation of the energy supply system 7. In this way, the heat dissipation fins 21 can be kept in a stable high-temperature state, thus ensuring a heating effect on the air flowing by. A decrease in temperature is not likely to occur in the greenhouse.

The energy supply system 7 includes a heat pump system 27. The heat pump system 27 can be arranged outside the greenhouse body 1. The heat pump system 27 is the existing technology, and will not be described in detail in this embodiment. Specifically, the heat pump system 27 is communicated with the water collection device 2 through a pipe. A circulation flow path for the cold source is formed between a cold end 30 of the heat pump system 27 and the condensation portion 5, and a circulation flow path for the heat source is formed between a hot end 31 of the heat pump system 27 and the reheating portion 6. The cold source may be cold water, and the heat source may be hot water. A flow valve 28 is arranged at an output port of the hot end 31 of the heat pump system 27. The flow valve 28 can be adjusted to control the hot water to enter the reheating portion 6 (that is, each heat dissipation fin 21), so that the reheating portion 6 heats the air in different extents. The air with different temperatures enter the greenhouse body 1 to adjust the temperature in the greenhouse, and plants in the greenhouse can grow in an appropriate temperature environment, thereby increasing a yield of the plants in the greenhouse.

The air pumping device 8 includes an axial flow fan 11 arranged on a side wall of the greenhouse body 1, and a return air duct 12 communicated to the axial flow fan 11 and arranged outside the greenhouse body 1. The return air duct 12 is buried in an underground soil layer and is provided with an air supply outlet 10 and a pumping opening 9. The air supply outlet 10 is communicated to the air inlet 3 of the water collection device 2. The axial flow fan 11 can efficiently pump the air in the greenhouse body 1 to the pumping opening 9 of the return air duct 12. The return air duct 12 leads the air to the air inlet 3 through the air supply outlet 10, and the water collection device 2 can then efficiently obtain water from the air. In addition, the air pumping device 8 and the water collection device 2 are opposite to each other. In this way, under the action of the air pumping device 8, there is a circulation flow path for the air in the greenhouse body 1, and the water collection device 2 can efficiently obtain water.

However, in the existing technology, most conventional condensers 13 have no special design in structures, and cooperation with the air pumping device 8 is not considered. Therefore, after the air pumping device 8 pumps a large amount of air to the air inlet, the air will flow through the condensers 13 quickly. As a result, the air does not contact the condensers 13 completely, which further causes that the air may still carry a large amount of water vapor when it is discharged back to the greenhouse body 1.

Therefore, in order to further improve the water obtaining efficiency and the water obtaining volume of the water collection device 2 to satisfy high-throughput water recycling under a high-humidity environment in the greenhouse body 1, the condensers 13 are columnar condensers. The surfaces of the condensers 13 are hydrophilic. The water obtaining device 2 is provided with a water outlet 17 located below the condensation portion 5. When the air flows through the condensation portion 5, water will be coagulated on the surfaces of the condensers 13. Under the action of gravity, the coagulated water drops will flow down and be gathered along the condensers 13, and are discharged through the water outlet 17. The collected water can be reused to irrigate the plants in the greenhouse. The surfaces of the condensers 13 are provided with several hydrophilic convex bars 18. The several hydrophilic convex bars 18 are hydrophilic. When the air flows through the condensers 13, water is more easily coagulated on the hydrophilic convex bars 18. More specifically, the several hydrophilic convex bars 18 have different sizes. The sizes of the several hydrophilic convex bars 18 gradually increase along axial directions of the condensers 13 towards one side of the water outlet 17. In other words, the sizes of the hydrophilic convex bars 18 located at upper portions of the condensers 13 are greater than the sizes of the hydrophilic convex bars 18 located at lower portions of the condensers 13. The hydrophilic convex bars 18 distributed in this way can achieve a balance between promoting water to be coagulated and gathering and transferring water drops. In detail, the hydrophilic convex bars 18 with larger bottoms can coagulate water drops with a larger diameter. The water drops with larger diameters are more easily gathered together and flows down into the water outlet 17 for discharging. The fast discharging of water can restore the surfaces of the condensers 13 to a use state for coagulating water, thereby further improving the water obtaining efficiency of the condensers 13 on the air in the greenhouse. Furthermore, the several hydrophilic convex bars 18 can be distributed in a staggered manner in an axial direction and a circumferential direction or distributed randomly. In this way, when the water drops located above drop down, the water drops flowing down drive the water drops on other hydrophilic convex bars 18 more easily, thereby quickly restoring the use state of the hydrophilic convex bars 18 for coagulating water.

A cross section of each condenser 13 has a blunt end 19 and a sharp end 20 which are opposite to each other. The blunt end 19 and the sharp end 20 are in arc transition, that is, the cross section of the condenser 13 is in a shape like a sunflower seed having one smooth end and one sharp end which are in smooth transition in the middle. The blunt end 19 faces one side of the air inlet 3, and a connecting axial line of the blunt end 19 and the sharp end 20 is parallel to an air flow direction of the air inlet 3. The surfaces of the condensers 13 of this structure can promote water coagulation, so that the air flowing through the condensation portion 5 will first contact the blunt ends 19 of the condensers 13, and then slowly pass through the surfaces of the condensers 13, thereby coagulating the water to the surfaces of the condensers 13 quickly and efficiently.

In actual applications of the water collection device 2, the inventor has found that an aspect ratio of the cross section of each condenser 13 is 4:1-2:1, and an aspect ratio of a longitudinal section of each hydrophilic convex bar 18 is 3:1-4:1, so that a water obtaining device has higher water obtaining efficiency. The so-called aspect ratio of the cross section of condenser 13 is a ratio of a length of the connecting axial line between the blunt end 19 and the sharp end 20 of the condenser 13 to a maximum width of the cross section of the condenser 13 perpendicular to the connecting axial line, and the so-called aspect ratio of the longitudinal section of the hydrophilic convex bar 18 is a ratio of a length of the longitudinal section of the hydrophilic convex bar 18 in a vertical direction to a maximum width in a horizontal direction. When air with a temperature of 30° C. and a relative humidity of 80% flows through the condensers 13 with a surface temperature of 20° C., the water collection efficiency is measured under different setting parameters, as shown in the following table:

TABLE I

Variations of a water collection volume at different parameters of the water obtaining device

| Upper average equivalent length | Upper average equivalent width | Lower average equivalent length | Lower average equivalent width | Air flow direction | Equivalent height | Distance between hydrophilic convex bars | Water collection volume (g/h) |
|---|---|---|---|---|---|---|---|
| 1.0 | 0.35 | 1.0 | 0.35 | Forward direction | 0.35 | 0.35 | 325 |
| 1.0 | 0.35 | 1.0 | 0.35 | Reverse | 0.35 | 0.35 | 208 |

TABLE I-continued

Variations of a water collection volume at different parameters of the water obtaining device

| Upper average equivalent length | Upper average equivalent width | Lower average equivalent length | Lower average equivalent width | Air flow direction | Equivalent height | Distance between hydrophilic convex bars | Water collection volume (g/h) |
|---|---|---|---|---|---|---|---|
| 1.0 | 0.35 | 1.0 | 0.35 | Forward direction | 0.35 | 0.35 | 246 |
| 1.0 | 0.35 | 1.0 | 0.35 | Forward direction | 0.35 | 0.35 | 159 |
| 0.75 | 0.25 | 1.5 | 0.45 | Forward direction | 0.45 | 0.45 | 432 |
| 0.75 | 0.25 | 1.5 | 0.45 | Forward direction | 0.45 | 0.45 | 398 |

It is worth noting that an upper average equivalent length refers to an average equivalent length of the hydrophilic convex bars 18 located at an upper half of the condenser 13, and a lower average equivalent length refers to an average equivalent length of the hydrophilic convex bars 18 located in a lower half of the condenser 13. Others are the same. A forward direction means that the air flows from the blunt end 19 to the sharp end 20 of the sunflower seed-shaped condenser 13, and a reverse direction is opposite to the forward direction.

Based on Table I, it is analyzed that under a condition that other parameters are the same, the water collection volume of the blunt end 19 of the condenser 13 facing one side of the air inlet 3 is greater than that of the sharp end 20 of the condenser 13 facing one side of the air inlet 3. However, with the gradual increase of the sizes of the hydrophilic convex bars 18 located at the lower half of the condenser 13, the water obtaining volume of the water collection device 2 also gradually increases. According to a test, when each hydrophilic convex bar 18 has a length of 0.5 to 1.5 cm, a width of 0.15 to 0.45 cm, an equivalent height (that is, a distance between an end surface of the hydrophilic convex bar 18 and a side wall of the condenser 13) of 0.15 to 0.45 cm, and a distance between adjacent hydrophilic convex bars 18 of 0.15 to 0.45 cm, the water obtaining efficiency of the water collection device 2 is relatively high.

It is worth mentioning that there is also a fog collection net 29 between the condensation portion 5 and the reheating portion 6. The fog collection net 29 is a fishnet-like structure woven by a hydrophilic material, and a mesh has an equivalent diameter of 0.5 to 1.5 cm. The fog collection net 29 can assist the condensation portion 5 to coagulate and adhere the water in the air, and the water obtaining efficiency of the water collection device 2 is higher.

The above descriptions are preferred implementations of the present disclosure. It should be understood that the present disclosure is not limited to the form disclosed herein and should not be regarded as the exclusion of other embodiments, but can be used for various other combinations, modifications, and environments. The present disclosure can be changed within the conceived scope by means of the above teachings or technologies or knowledge in the related art. The modifications and changes made by those skilled in the art do not depart from the spirit and scope of the present disclosure, and shall all fall within the protection scope of the appended claims of the present disclosure.

What is claimed is:

1. A water recycling type greenhouse, comprising a greenhouse body (1), wherein a water collection device (2) is arranged in the greenhouse body (1); the water collection device (2) is provided with an air inlet (3) and an air outlet (4); a condensation portion (5) and a reheating portion (6) are arranged in the water collection device (2); air in the greenhouse body (1) is poured from the air inlet (3) and flows through the condensation portion (5), the reheating portion (6) and the air outlet (4) in sequence; the water recycling type greenhouse further comprises an energy supply system (7); the energy supply system (7) is able to supply a cold source to the condensation portion (5), so that the air flows through the condensation portion (5) to coagulate water; the energy supply system (7) is further able to supply a heat source to the reheating portion (6), so that the reheating portion (6) heats the air flowing by; the water recycling type greenhouse further comprises an air pumping device (8); the air pumping device (8) and the water collection device (2) are respectively located on two opposite sides of the greenhouse body (1); the air pumping device (8) is able to pump the air in the greenhouse body (1) to the air inlet (3), so that the air in the greenhouse body (1) is circulated between the water collection device (2) and the air pumping device (8).

2. The water recycling type greenhouse according to claim 1, wherein the air pumping device (8) comprises an axial flow fan (11) arranged on a side wall of the greenhouse body (1), and a return air duct (12) communicated to the axial flow fan (11); an air supply outlet of the return air duct (12) is communicated to the air inlet (3); and the axial flow fan (11) is used for pumping the air in the greenhouse body (1) to the return air duct (12).

3. The water recycling type greenhouse according to claim 2, wherein the return air duct (12) is located outside the greenhouse body (1), and is buried in an underground soil layer.

4. The water recycling type greenhouse according to claim 1, wherein the condensation portion (5) comprises several arrayed condensers (13); cooling cavities (14) are arranged in the condensers (13); bottom ends of the condensers (13) are provided with cold source inlets (15) communicated to the cooling cavities (14); top ends of the condensers (13) are provided with cold source outlets (16) communicated to the cooling cavities (14); the energy supply system (7) is able to inject the cold source to each cold source inlet (15); and the cold source returns to the energy supply system (7) from the cold source outlets (16).

5. The water recycling type greenhouse according to claim 4, wherein the condensers (13) are columnar condensers (13); the water collection device (2) is provided with a water outlet (17) located below the condensation portion (5);

surfaces of the condensers (13) are provided with several hydrophilic convex bars (18); the several hydrophilic convex bars (18) have different sizes; and the sizes of the several hydrophilic convex bars (18) gradually increase along axial directions of the condensers (13) towards one side of the water outlet (17).

6. The water recycling type greenhouse according to claim 5, wherein an aspect ratio of a longitudinal section of each hydrophilic convex bar (18) is 3:1-4:1.

7. The water recycling type greenhouse according to claim 5, wherein a cross section of each condenser (13) has a blunt end (19) and a sharp end (20) which are opposite; the blunt end (19) and the sharp end (20) are in arc transition; the blunt end (19) faces one side of the air inlet (3); and axial lines of the blunt end (19) and the sharp end (20) are parallel to an air flow direction of the air inlet (3).

8. The water recycling type greenhouse according to claim 7, wherein an aspect ratio of the cross section of each condenser (13) is 4:1-2:1.

9. The water recycling type greenhouse according to claim 1, wherein the reheating portion (6) comprises several heat dissipation fins (21) arrayed along a vertical direction; heating cavities (22) are arranged in the heat dissipation fins (21); one end of each heat dissipation fin (21) is provided with a heat source inlet (23) communicated to the heating cavity (22); the other end of each heat dissipation fin (21) is provided with a heat source outlet (24) communicated to the heating cavity (22); the energy supply system (7) is able to inject the heat source to each heat source inlet (23); and the heat source returns to the energy supply system (7) from the heat source outlet (24).

10. The water recycling type greenhouse according to claim 1, wherein an air guide portion (25) and a fog collection net (29) are further arranged in the water collection device (2); the air guide portion (25) is located between the air inlet (3) and the condensation portion (5); two ends of the air guide portion (25) are respectively communicated to the air inlet (3) and the condensation portion (5); the air guide portion (25) is used for guiding the air entering the air inlet (3) to the condensation portion (5); and the fog collection net (29) is located between the condensation portion (5) and the reheating portion (6).

* * * * *